(12) United States Patent
     Weingarten (10) Patent No.: US 9,400,063 B2
(45) Date of Patent: Jul. 26, 2016

(54) HYDRAULIC TORRENT CONTROL VALVE

(71) Applicant: BERMAD CS LTD., Evron (IL)

(72) Inventor: Zvi Weingarten, Kibbutz Evron (IL)

(73) Assignee: BERMAD CS LTD., Kibbutz Evron (IL)

(*) Notice: Subject to any disclaimer, the term of this patent is extended or adjusted under 35 U.S.C. 154(b) by 757 days.

(21) Appl. No.: 13/867,086

(22) Filed: Apr. 21, 2013

(65) Prior Publication Data

US 2013/0233417 A1 Sep. 12, 2013

Related U.S. Application Data

(62) Division of application No. 12/794,786, filed on Jun. 7, 2010, now Pat. No. 9,068,664.

(51) Int. Cl.
| F16K 37/00 | (2006.01) |
| F16K 7/17 | (2006.01) |
| F16K 17/04 | (2006.01) |
| F16K 27/02 | (2006.01) |
| F16K 27/00 | (2006.01) |
| F16K 1/42 | (2006.01) |

(52) U.S. Cl.
CPC ............ *F16K 37/0008* (2013.01); *F16K 1/427* (2013.01); *F16K 7/17* (2013.01); *F16K 17/0453* (2013.01); *F16K 27/00* (2013.01); *F16K 27/0236* (2013.01); *F16K 37/0058* (2013.01); *Y10T 137/7922* (2015.04); *Y10T 137/8225* (2015.04); *Y10T 137/8275* (2015.04)

(58) Field of Classification Search
CPC . F16K 37/00; F16K 37/0008; F16K 37/0016; F16K 37/0058; G01D 5/00; G01D 5/02; G01D 5/04
USPC ......... 116/228, 277, 279, 281, 282, 283, 284, 116/285
See application file for complete search history.

(56) References Cited

U.S. PATENT DOCUMENTS

| 775,544 | A | * | 11/1904 | Rantz et al. | ............. | G01F 23/50 116/228 |
| 1,323,812 | A | * | 12/1919 | Baruch | ................... | F28F 27/00 116/228 |
| 1,641,380 | A | * | 9/1927 | Geyer | ..................... | G01F 23/50 116/228 |

(Continued)

FOREIGN PATENT DOCUMENTS

| EP | 0797080 A2 * | 9/1997 | ................ G01F 1/28 |
| EP | 1589267 A1 * | 10/2005 | ............. G01L 19/10 |

(Continued)

*Primary Examiner* — R. A. Smith
(74) *Attorney, Agent, or Firm* — Mark M. Friedman (57) ABSTRACT

A hydraulic control valve actuated by a diaphragm's integral spring whose thicker part acts with greater force to close the diaphragm and plug unit of the valve and whose thinner part may complete the closing motion so that the integral spring may weaken faster than linearly in relation to displacement of the diaphragm and plug unit. A snap seat supporting the plug may include a seat portion and a grip skirt portion integrally joined at an acute angle. A bracket and sliding guide may guide a helical rotor touching an indicator. Movement of the diaphragm and plug unit may rotate the helical rotor and the indicator without the indicator rising out of the valve. The cover may have an internal control passage in communication with a base of the valve to allow the cover to be installed horizontally and vertically conveniently and without disconnecting the control tubing above the valve.

5 Claims, 13 Drawing Sheets

(56) References Cited

U.S. PATENT DOCUMENTS

| | | | |
|---|---|---|---|
| 2,197,954 A * | 4/1940 | Turpin | F16K 5/00 137/556 |
| 4,715,578 A | 12/1987 | Seltzer | |
| 4,724,706 A * | 2/1988 | Stiever | G01F 23/50 116/228 |
| 5,108,067 A | 4/1992 | Straub | |
| 5,148,709 A * | 9/1992 | Ross, Jr. | G01F 23/48 116/228 |
| 5,383,646 A | 1/1995 | Weingarten | |
| 5,464,064 A | 11/1995 | Weingarten | |
| 5,632,465 A | 5/1997 | Cordua | |
| 5,909,747 A | 6/1999 | Schieber | |
| 6,109,296 A | 8/2000 | Austin | |
| 6,216,731 B1 | 4/2001 | Frenkel | |
| 7,059,578 B2 | 6/2006 | Frenkel | |
| 8,434,634 B2 * | 5/2013 | Bork et al. | G01F 23/50 116/228 |
| 8,596,295 B2 * | 12/2013 | Colpan et al. | F16K 37/0008 116/277 |
| 2013/0146793 A1 * | 6/2013 | Gustafson | E21B 33/062 251/1.3 |

FOREIGN PATENT DOCUMENTS

| | | | |
|---|---|---|---|
| FR | 802439 A * | 9/1936 | F16K 37/0016 |
| WO | WO 2010097734 A1 * | 9/2010 | F16K 31/124 |

* cited by examiner

FIG. 9

HYDRAULIC TORRENT CONTROL VALVE

FIELD AND BACKGROUND OF THE INVENTION

The present invention generally relates to apparatus and methods for hydraulic automatic control valves and more particularly, to apparatus and methods for such valves with spring-less diaphragms.

Automatic hydraulic control valves pose several design challenges. First, they require position indicators for displaying the valve opening rate, i.e. how high above the seat the hydraulic control valve is. These position indicators are typically comprised of a stem that sticks up and reflects the vertical position of the diaphragm. These indicators are vulnerable to being struck on the side and bent by elements such as control tubing associated with the valve. These indicators are also prone to leakage because they are hard to seal since they bob up and down from a wet area inside the valve to a dry area outside the valve, where the indicator is subject to being covered with dirt which wears out the seal.

Second, there is a general problem of how to put a valve seat comprised of a stainless steel ring into the internal coated surface of the valve without penetrating the coating, which causes rust damage.

A third problem is that above the cover of the valve is a significant amount of control equipment associated with the valve, such as solenoids, pressure pilots and control tubing that has to be connected to the cover of the valve. In order to inspect the diaphragm inside the valve, the valve cover must be removed and this requires dismounting the significant amount equipment each time the inspection is performed. In addition, installation of the valve covers may be further complicated by the need to position the control mouth within the control chamber at its highest point for air removal.

A further design issue with hydraulic control valves having single chamber actuators is designing a spring that triggers the valve closing on minimal differential pressure across the valve. A still further design issue is how to design drainage of the upstream and downstream portions of the valve in a convenient manner for a variety of systems the location of whose drain piping or other components may not be known in advance. Finally, the number of parts should be minimized for and for performance reasons and for cost reasons, since each part has to be designed, manufactured, tested, inspected, etc.

There is an ongoing need for improved design of hydraulic control valves and position indicators for such valves.

SUMMARY OF THE PRESENT INVENTION

One aspect of the present invention is a hydraulic control valve, comprising a cover; a diaphragm and plug unit, the diaphragm including a rim sealable by the cover and including an integral spring between the rim and the plug; and a control chamber between the cover and the diaphragm and plug unit, the diaphragm and plug unit, in a down position, blocking a flow channel and in an up position unblocking the flow channel, the integral spring tapered so as to comprise a thinner portion further from the plug than a thicker portion, during a closing motion of the diaphragm and plug unit the thicker portion exerting a force to move the diaphragm and plug unit down in an initial motion and the thinner portion completing the closing motion by exerting a weaker force than the force exerted by the thicker portion.

A further aspect of the present invention may be an indicator mechanism, comprising a position indicator that is dry; and a mechanism that is wet, the mechanism including (a) a bracket moving in response to movement of a measured element and (b) a rotor that turns the position indicator, wherein the bracket converts a reciprocating movement of the bracket to a rotational movement of the rotor.

A further aspect of the present invention is directed to an assembly for an indicator, comprising a bracket having a sliding guide, the bracket capable of being positioned between a diaphragm position indicator and a plug; and a helical rotor capable of being positioned so that a top portion of the helical rotor is associated with the diaphragm position indicator and so that movement of the plug rotates the helical rotor.

A still further aspect of the present invention is an indicator mechanism, is comprising a diaphragm position indicator; a bracket having a sliding guide and situated between the diaphragm position indicator and a diaphragm and plug unit; and a helical rotor whose top portion is associated with the diaphragm position indicator, wherein a movement of the diaphragm and plug unit rotates the helical rotor.

A yet still further aspect of the present invention is a snap seat for supporting a plug of a diaphragm and plug unit of a valve, comprising a flat annular seat portion;

and a grip skirt portion integrally joined to the seat portion at an acute angle, the grip skirt portion having a plurality of slots that divide the grip skirt portion into sections so that the snap seat snaps into place when the grip skirt portion is pressed against a body undercut of the valve.

Another aspect of the present invention is directed to a cover for a control valve, the valve having valve control equipment situated above the valve, the cover comprising a valve cover having an internal control passage in communication with a base of the valve, the passage sufficient to house valve control tubing and operatively engaged to the valve at a control boss on a body of the valve, the valve cover removable from a body of the valve without disconnecting the control equipment.

A still further aspect of the present invention is a hydraulic control valve having a first drain hub for draining an upstream side of the valve and a second drain hub for draining a downstream side of the valve, the first and second drain hubs having an elbow shape allowing the first and second drain hubs to swivel, the first drain hub and the second drain hub capable of being connected to one another at a 3-way valve whereby in a first position the upstream side drains, in a second position the downstream side drains and in a third position neither side drains.

These and other features, aspects and advantages of the present invention will become better understood with reference to the following drawings, descriptions and claims.

BRIEF DESCRIPTION OF THE DRAWINGS

Various embodiments are herein described, by way of example only, with reference to the accompanying drawings, wherein:

FIG. 1aa is a fragmentary perspective view of the bolt, upstream drain boss and drain boss cover shown in FIG. 1, in accordance with one embodiment of the present invention;

FIG. 1a1 is a cross-section view of an automatic hydraulic control valve, in accordance with one embodiment of the present invention, in fully open position;

FIG. 1a2 is a cross-section view of an automatic hydraulic control valve, in accordance with one embodiment of the present invention, in closed position;

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

The present invention generally provides a hydraulic control valve that may, for example, be used to control a sprinkler system or any other fluid control system. The valve may be actuated by a diaphragm that may have an integral spring whose thicker elastomeric part may act first with greater force to close the diaphragm and plug unit of the valve and whose thinner part may complete the closing motion so that the integral spring may weaken faster than linearly in relation to a displacement of the diaphragm and plug unit. A snap seat supporting the plug may include a flat annular seat portion and a grip skirt portion integrally joined to the seat portion at an acute angle. The grip skirt portion may expand when the grip skirt portion is pressed against a wall of the valve to snap the seat into place to a valve bore undercut. Sitting on the snap seat may be a bracket having a sliding guide that may guide a helical rotor whose top portion may touch a diaphragm position indicator. The up and down movement of the diaphragm and plug unit may rotate the helical rotor and the indicator without parts of the indicator sticking up outside the valve. The valve cover may have an internal control passages in communication with a base of the valve at two different 180 degrees-apart positions to allow the cover to be installed horizontally and vertically conveniently and to allow the cover to be unbolted without disconnecting the control tubing above the valve. Drain tubes may be swiveled and controlled by a 3-way valve directing which or both of the upstream or downstream valve sides can drain.

In contrast to prior art hydraulic control valves, in which the spring is a separate element or if there is an integral spring it weakens linearly in relation to a displacement of the diaphragm and plug unit, the hydraulic control valve of the present invention may have an integral spring that may weaken faster than linearly in relation to displacement of the diaphragm and plug unit during closing of the valve. In further contrast to prior art hydraulic control valves, in which the significant amount of control tubing has to be dismounted each time the valve cover is removed to inspect the diaphragm, the hydraulic control valve of the present invention may incorporate one or more internal control passages in the valve cover connecting the control tubing to the base of the valve. Removing the valve cover may not require moving the control equipment. In further contrast to the prior art, in which the valve cover cannot be conveniently installed both vertically and horizontally and be effective for air removal, in the hydraulic control valve of the present invention, both vertical and horizontal installation of the valve cover may be possible in a manner that allows positioning for the control mouth within the control chamber at a highest point for air removal. In still further contrast to the prior art, in which the valve seat may penetrate, damage and/or rust the coated surface of the valve bore undercut, the hydraulic control valve of the present invention has a snap seat sealed with an O-ring that may avoid this kind of damage or penetration. In still further contrast to the prior art, in which the indicators of the position of the diaphragm leak since they alternate from wet to dry locations and are subject to being covered with dirt which wears out the seal and/or the indicators are prone to bending from being struck since they may project out of the valve, the indicator of the valve of hydraulic control valve of the present invention is entirely inside the valve and does not move from wet to dry position. Hence, the indicator may not be subject to bending or leakage. In contrast to the prior art, in which the drain hubs may not be compatible with drain piping of a variety of systems that the valve be used for, the hydraulic control valve of the present invention has drain hubs with elbow fittings that can swivel to mate with system drain piping located in multiple positions and can control whether upstream and downstream sides of the valve may drain.

The principles and operation of an apparatus and method for a hydraulic control valve according to the present invention may be better understood with reference to the drawings and the accompanying description.

Figure 1:
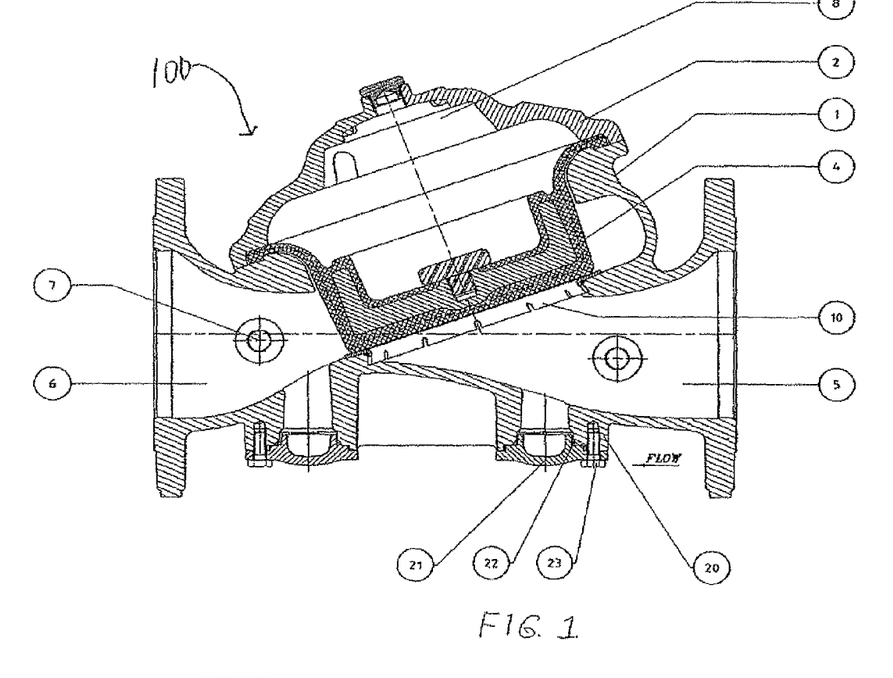
FIG. 1 is a cross-section view of an automatic hydraulic control valve, in accordance with one embodiment of the present invention.
Figure 1A:
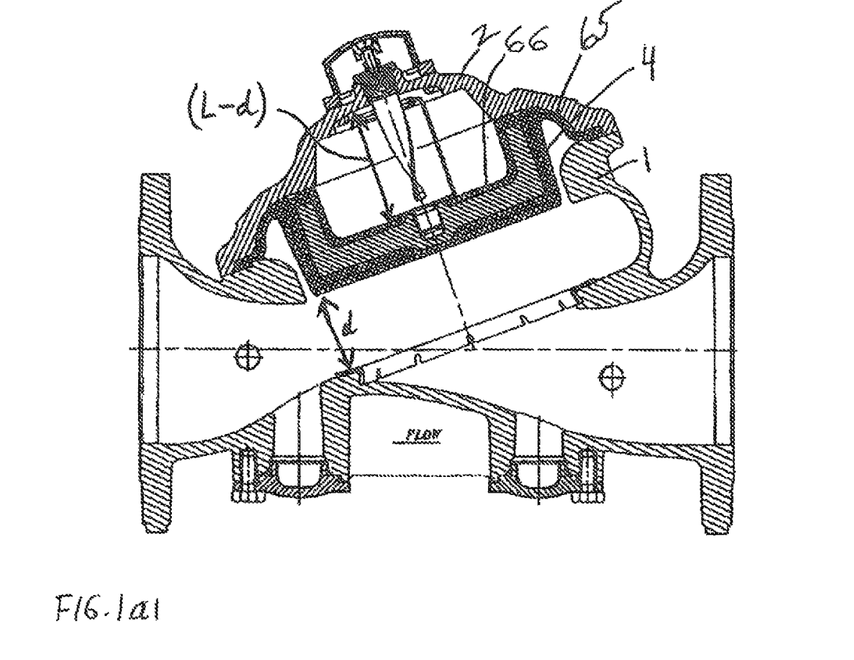
Figure 1A:
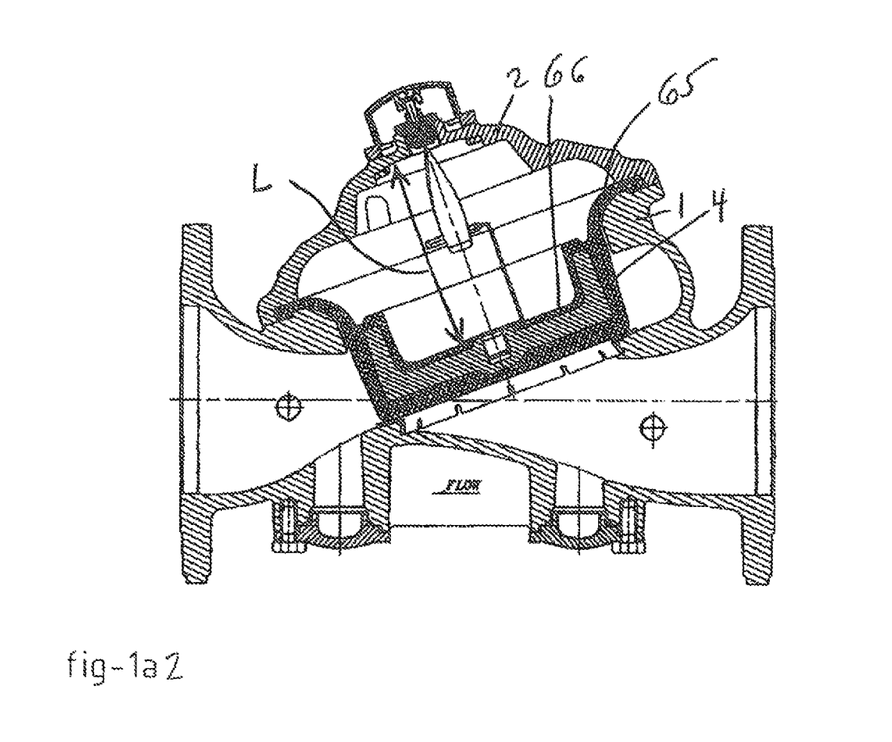
Figure 2:
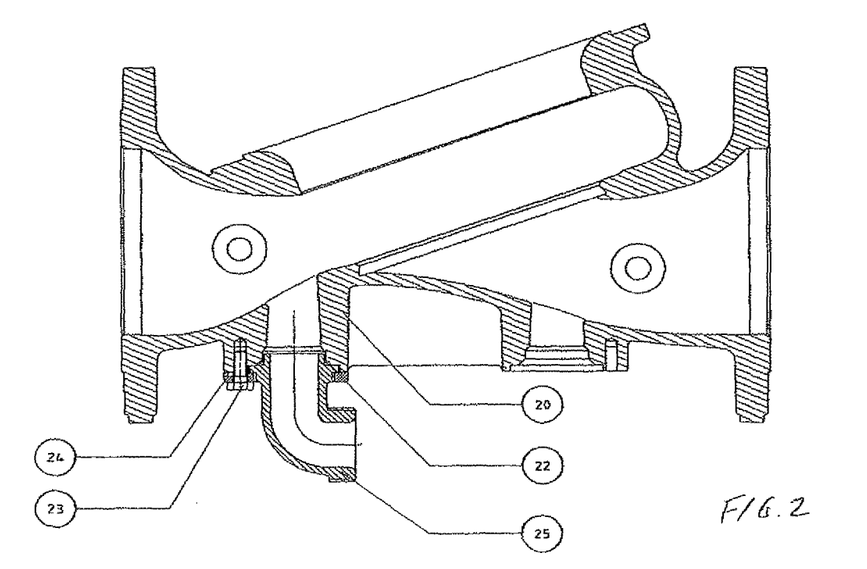
FIG. 2 is cross-section view of a portion of an automatic hydraulic control valve, in accordance with one embodiment of the present invention, showing the swivel downstream drain elbow.
Figure 2A:
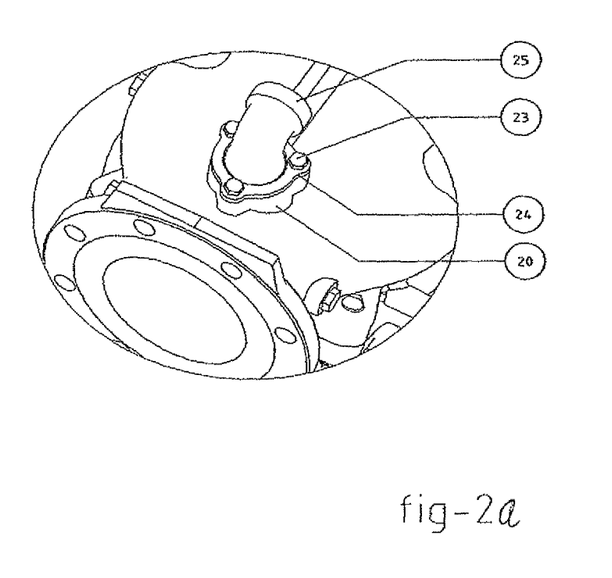
FIG. 2a is a fragmentary perspective view of the downstream drain elements, in accordance with one embodiment of the present invention

As seen in FIG. 1, the present invention may be described as a hydraulic control valve 100, comprising a valve cover 2 covering a valve body 1. Valve 100 also includes a diaphragm and plug unit 4. Valve body 1, diaphragm and plug unit 4 (including plug 66 and diaphragm 65) and valve cover 1 may together be inclined relative to the flow channel of liquid, such as water. As can be seen from FIG. 1, valve inlet 5 can be called the "upstream" side of valve 100, and valve outlet 6 the "downstream" side of the valve 100. In comparing FIG. 1a1 with FIG. 1a2, it can readily be seen that diaphragm and plug unit 4, in a "closed" or "down" position, may block the flow channel from valve inlet 5 to valve outlet 6 and, as seen in FIG. 1a1, in an "open" or "up" position may unblock the flow channel from valve inlet 5 to valve outlet 6 allowing fluid to cross from upstream to downstream sides of valve 100.

A control chamber 8 may be situated between valve cover 2 and diaphragm and plug unit 4. Side body control boss 7 may be located on a side of valve 100. As can be seen from the bottom of FIG. 1 and from FIG. 1aa, valve 100 may drain on the upstream side with the help of drain boss 20, drain boss cover 21, O-ring 22 and bolt 23.

Figure 8:
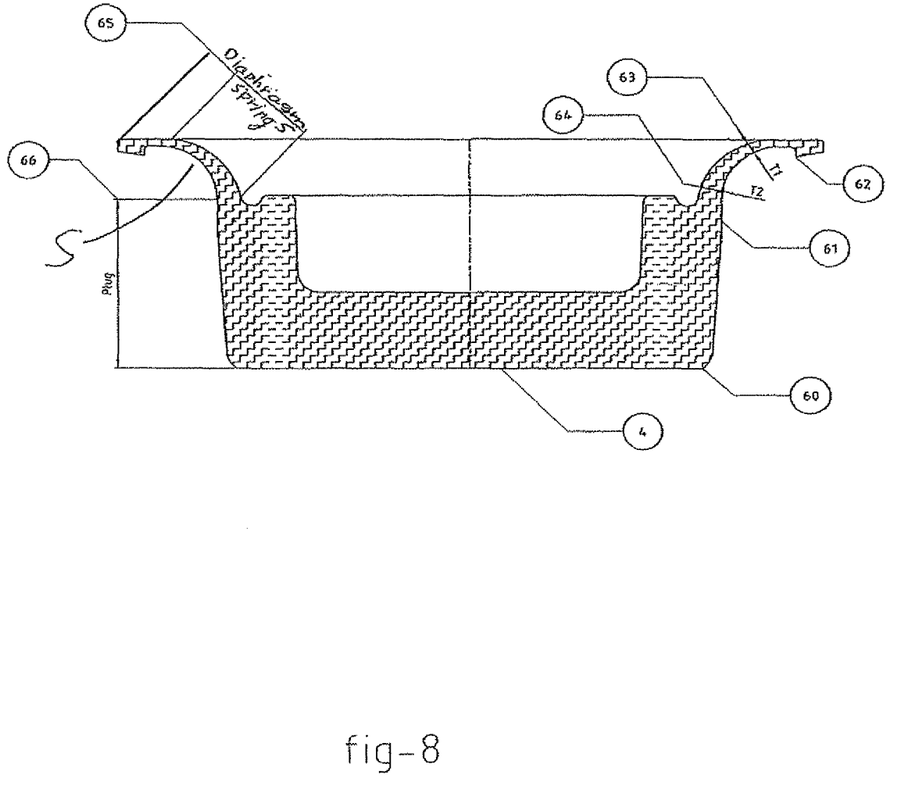
FIG. 8 is a cross-section view of the diaphragm and plug unit, in accordance with one embodiment of the present invention.

As seen in FIG. 8, diaphragm and plug unit 4 may include a diaphragm 65 representing the flexing part and a plug 66 representing the relatively rigid part. Plug 66 may comprise a central portion of the diaphragm and plug unit 4. Diaphragm 65 may include a rim 62 that may be sealable against valve body 1 by valve cover 2. Rim 62 may be held stationary by valve cover 2 while a remainder of diaphragm 65 may move up and down. Accordingly, diaphragm 65 may include an integral spring S that may be situated between rim 62 and plug 66. In the embodiment shown in FIG. 8 the entire area labeled "diaphragm" which excludes rim 62, is an integral spring S. It can be appreciated that in alternative embodiments the diaphragm 65 could be defined as only comprising spring S and hence only including thinner portion 63 and thicker portion 64 without rim 62.

Figure 7A:
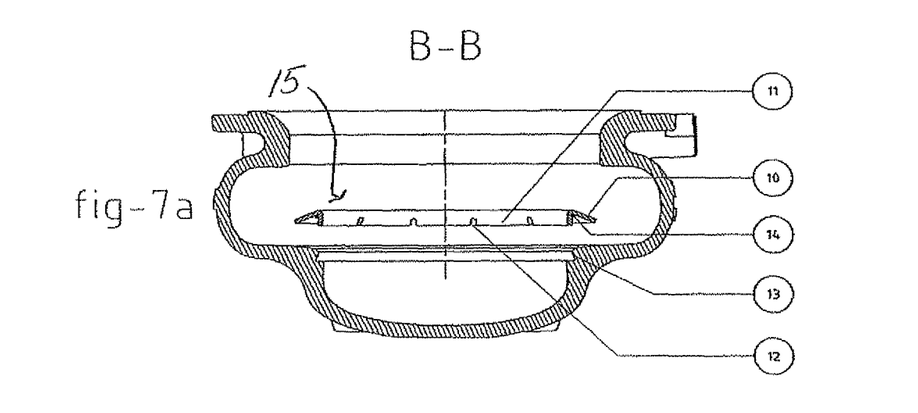
FIG. 7a is a sectional view, taken along line B-B of FIG. 6c showing the snap seat not installed, in accordance with one embodiment of the present invention.
Figure 7B:
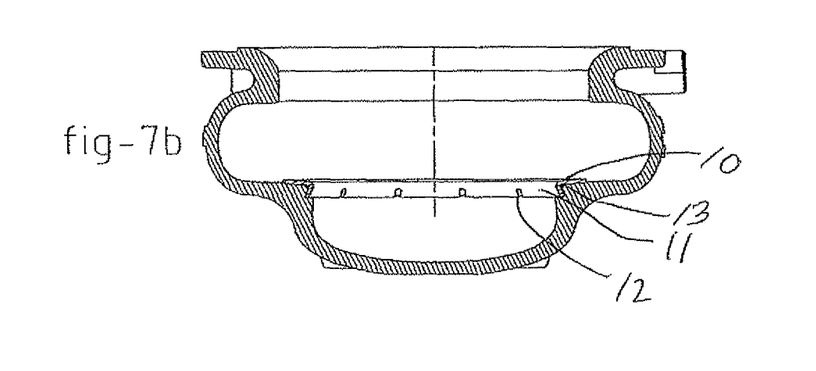
FIG. 7b is a sectional view, taken along line B-B of FIG. 6c showing the snap seat installed, in accordance with one embodiment of the present invention.
Figure 8A:
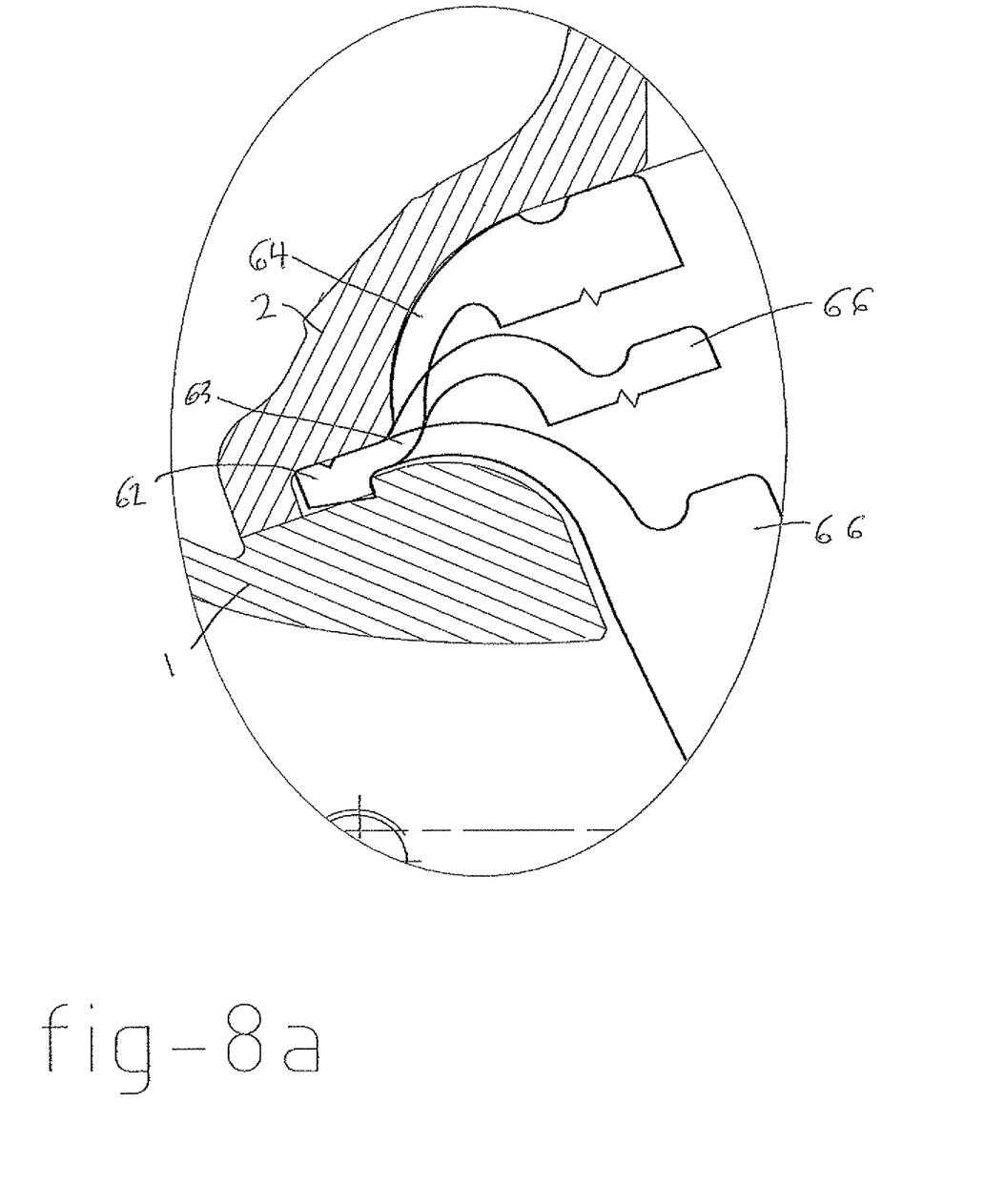
FIG. 8a is an enlarged view of the diaphragm in successive positions during a closing motion of the hydraulic control valve, in accordance with one embodiment of the present invention.
Figure 9:
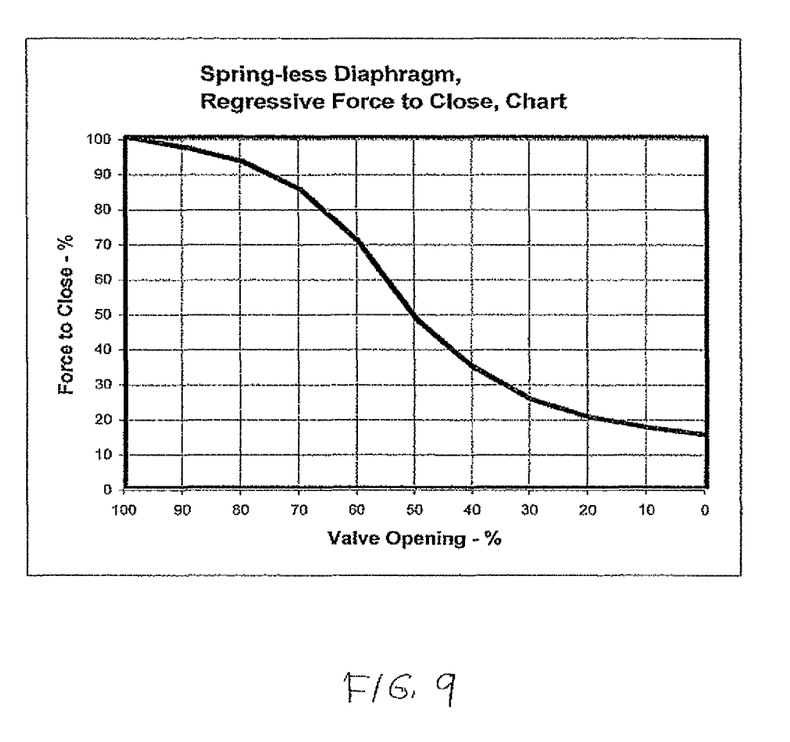
FIG. 9 is a graph showing the non-linearity of the force to close the hydraulic control valve in relation to the percentage of opening of the valve.

Integral spring S may include a thinner portion 63 (also labeled "T1" in FIG. 8) and a thicker portion 64 (also labeled "T2" in FIG. 8). Thinner portion 63, which may be adjacent rim 62, may be further from plug 66 than thicker portion 64, which may be nearer or adjacent plug 66. As can be seen from FIG. 8a, during a closing motion of diaphragm and plug unit 4, thicker portion 64 of diaphragm 65 may act first to exert a force to move diaphragm and plug unit 4 down toward the seat portion 10 (see FIG. 7a) of seat 15 (see FIG. 7a) in an initial motion. Thinner portion 63 may complete the closing motion by exerting a weaker force than the force exerted by the thicker portion 64. Accordingly, as may be seen from the graph of FIG. 9, as valve 100 closes, i.e. as diaphragm and plug unit 4 is displaced downward toward valve seat 10, a closing force of the integral spring S may weaken faster than linearly in relation to a displacement of diaphragm and plug unit 4. This is in contrast to a linear relationship that may be present in a typical spring. As also seen from FIG. 8a, in the up position integral spring S (i.e. T1 and T2) may be urged against and may be pressed against valve cover 2. In fact, in the fully open position a top portion of plug 66 may be pressed against valve cover 2.

As seen in FIG. 1a2, in the closed or down position the top surface of diaphragm and plug unit 4 may be said to be substantially similar in shape to an upside down capital Omega "a" in the Greek alphabet. This shape is not meant to be limiting and diaphragm and plug unit 4 may have other shapes. Typically, however, the central surface of plug 66 may be lower than rim 62 of diaphragm 65 when diaphragm 65 is closed in a down position, as shown for example in FIG. 1a2 or in FIG. 8.

Figure 7C:
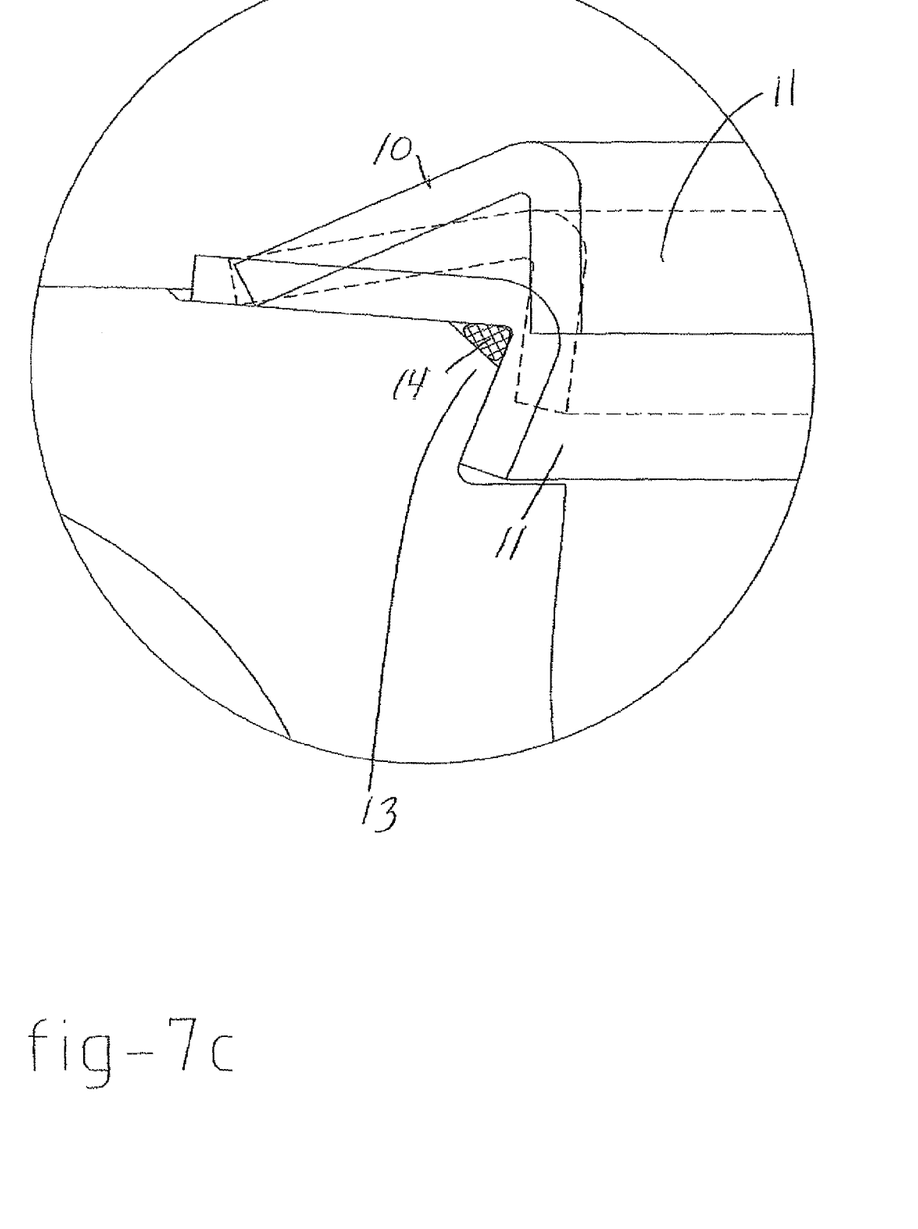
FIG. 7c is an enlarged view of one end of the snap seat in several positions, in accordance with one embodiment of the present invention.
Figure 7D:
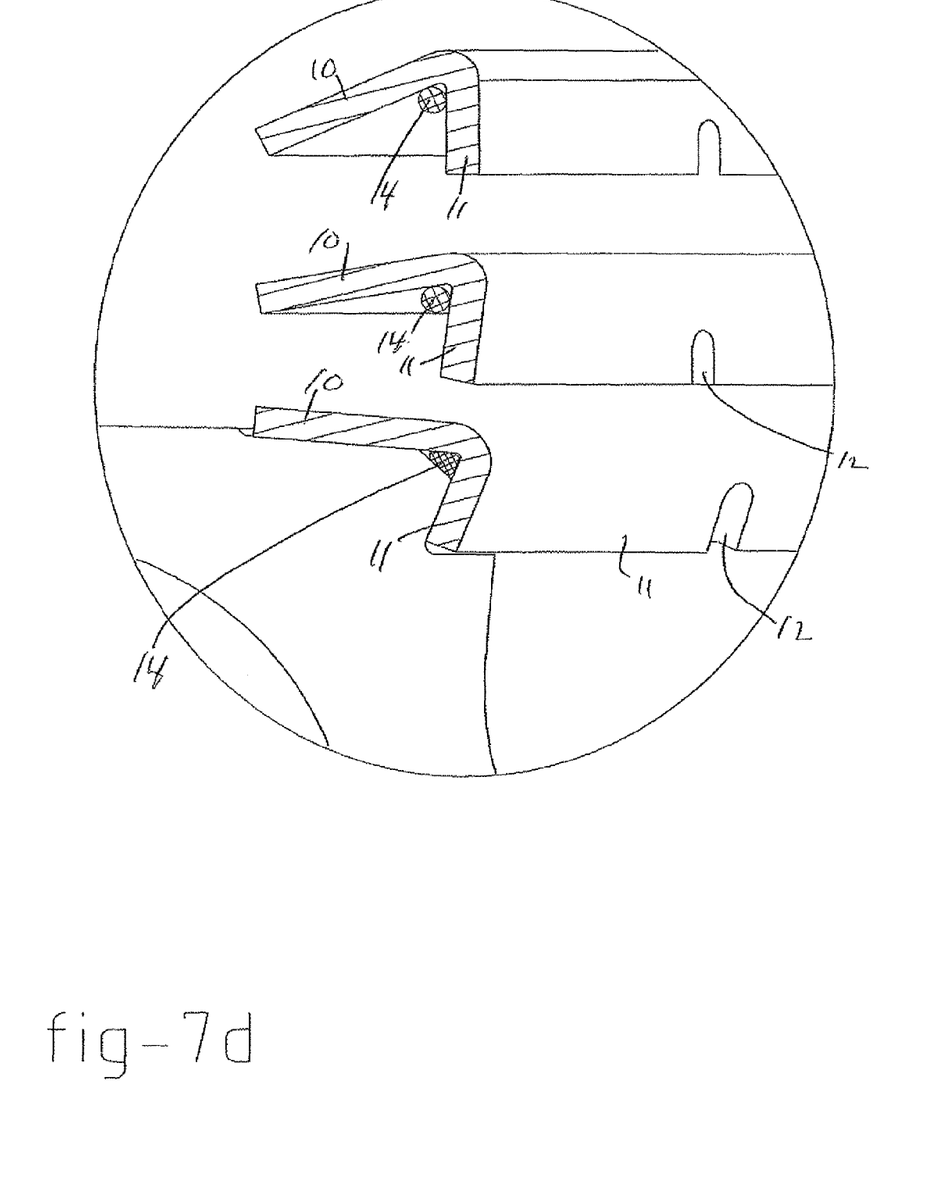
FIG. 7d is an enlarged view of one end of the snap seat in several positions, and showing expansion of the slot and grip skirt, in accordance with one embodiment of the present invention.

A specially designed snap seat 15 may provide support for plug 66 of diaphragm and plug unit 4 to rest on. As seen from FIG. 7a, which shows snap seat 15 prior to installation in valve body 1, snap seat 15 may include a flat annular seat portion 10 a grip skirt portion 11 integrally joined to the seat portion 10 at what may be an acute angle. Grip skirt portion 11 may have a plurality of slots 12 that may be said to divide grip skirt portion 11 into sections. Slots 12 allow the sections of the grip skirt portion 11 to expand when grip skirt portion 11 may be pressed against the valve body undercut 13, which may be a wall or ledge of valve body 1 and may also be referred to as the valve bore undercut 13. Snap seat 15 may thereby snap into place in valve body 1 with the help of O-ring 14 since, as seen in FIG. 7c and in FIG. 7d, O-ring 14 may seal snap seat 15 to valve body undercut 13 at the angle where seat portion 10 joins grip skirt portion 11. In alternative embodiments, this angle between seat portion 10 and grip skirt portion may not be an acute angle or may be approximately 90 degrees or even larger. As can be seen from FIG. 4, FIG. 4a and FIG. 4b, hydraulic control valve 100 may have a specially designed indicator mechanism 29 comprising a diaphragm position indicator 39, a bracket 30 having a sliding guide 32 and a helical rotor 33. Bracket 30 may sit on plug 66 of diaphragm and plug unit 4 and hence may be situated in control chamber 8 between the diaphragm position indicator 39 and diaphragm and plug unit 4. Bracket 30 may have a bracket bolt 31 that may allow bracket 30 to attach to plug 66, for example at a central portion of plug 66.

Figure 4A:
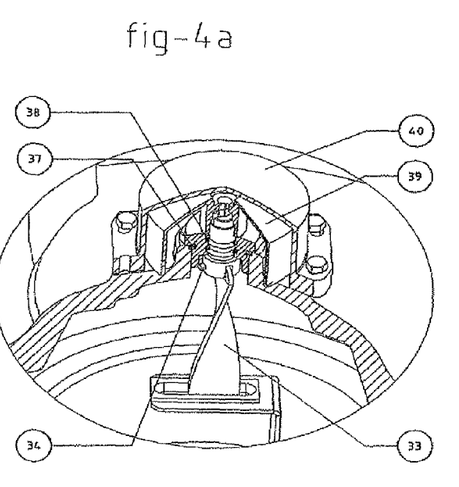
FIG. 4a is a partial sectional view of the indicator mechanism, in accordance with one embodiment of the present invention.
Figure 4B:
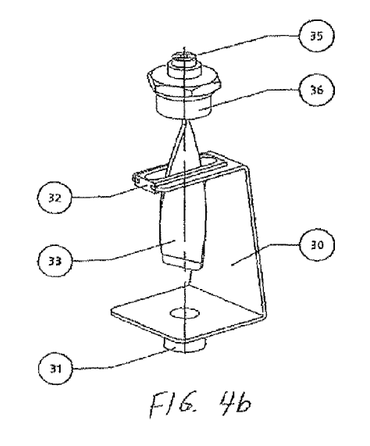
FIG. 4b is an isometric view of most of the indicator mechanism, in accordance with one embodiment of the present invention.
Figure 4C:
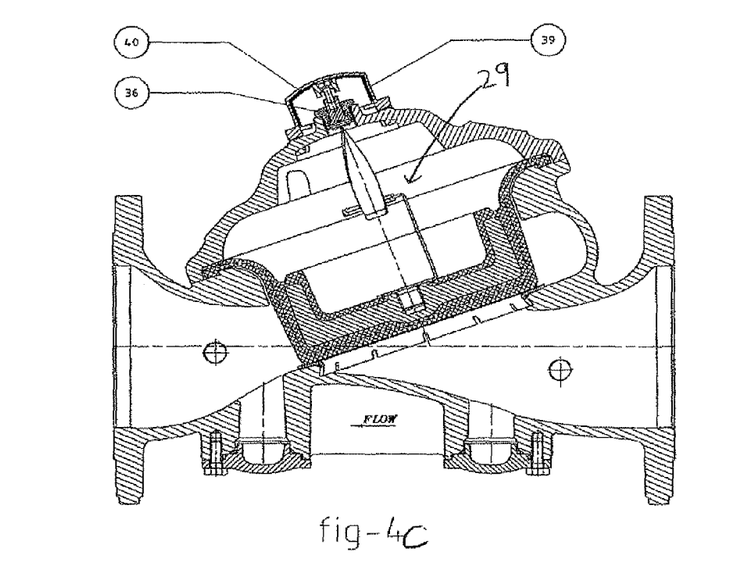
FIG. 4c is cross-section view of the automatic hydraulic control valve including the indicator mechanism, in accordance with one embodiment of the present invention.

Helical rotor 33 may have a top portion that may be associated with diaphragm position indicator 39. For example, the top portion of helical rotor 33 may be attached to or may include a rotor stem 35 that may be operatively engaged to diaphragm position indicator 39, for example engaged to an indicator plug 36 of indicator 39, so that rotation of the helical rotor 33 may rotate the diaphragm position indicator 39. As seen in FIG. 4a, indicator plug O-ring 37 and rotor stem O-ring 38 may assist in securely attaching helical rotor 33 to indicator 39, along with rotor pin 34. O-ring 37 and O-ring 38 seal off the wet indicator mechanism 29 from all or most of the dry diaphragm position indicator 39.

Indicator 39 may be a turning indicator and may be visible through transparent indicator dome 40. Indicator 39 may be defined to not include dome 40 so that no part of indicator 39 or indicator mechanism 29 may be exposed to dirt.

As can be appreciated, a movement of the diaphragm and plug unit 4, for example an up and down or a reciprocating movement toward and away from the diaphragm position indicator may rotate helical rotor 33 because the up and down movement of sliding guide 32 may cause helical rotor 33 to rotate. However, the helical rotor 33 including stem 35 may remain stationary. No part of indicator mechanism 29 need stick out of valve 100 or be exposed to dirt. The entire indicator mechanism 29 may be inside valve 100, which may be a hydraulic control valve that may be a diaphragm valve or a piston actuated valve.

An assembly for indicator mechanism 29 may be defined as including (i) bracket 30 having sliding guide 32, the bracket capable of being positioned between diaphragm position indicator 39 and plug 66, and (ii) helical rotor 33 capable of being positioned so that a top portion of the helical rotor may be associated with, for example by being attached to, diaphragm position indicator 39 and so that movement of plug 66 (i.e. up and down) may rotate helical rotor 33. Alternatively, an assembly for indicator mechanism 29 may be defined to include bracket 30, sliding guide 32, helical rotor 33 including stem 35, and indicator plug 36.

Thus the twisted strip of helical rotor 33 serves as a helical track engaged with slider 32 of bracket 30, thereby defining a linear-to-rotary linkage turning linear motion of plug 66 into rotation of rotating indicator 39. As seen most clearly in FIGS. 1a(1) and 1a(2), the dimension of the helical track and the bracket are such that they maintain engagement in the closed state of the valve (FIG. 1a(2)) and yet both fit within the reduced gap in the fully open state of FIG. 1a(1). Both the helical track and the bracket have a dimension along the direction of movement of the plug that is greater than a range of movement of the plug, designated d in FIG. 1a(1), while also being less than the difference (L–d) between a maximum gap L between the plug and the cover when the plug is in its closed position and the range of movement d of the plug.

The present invention may also be characterized generally as an indicator mechanism 29 comprising a position indicator 39 that is dry and a mechanism that is wet. The mechanism may include (a) a bracket 30 moving in response to movement of a measured element and (b) a rotor 33 that turns the position indicator 39. Bracket 30 may convert its own reciprocating movement to a rotational movement of rotor 33, for example by means of sliding guide 32. In this case, the measured element 66 may be plug 66 in valve 100. Accordingly, position indicator 39 may indicate the position of plug 66. In this characterization of the present invention, position indicator 39 may include or may not include dome 40

Valve cover 2 may be designed for a control valve that may have control equipment (not shown), for example control tubing, situated above the control valve.

Figure 5A:
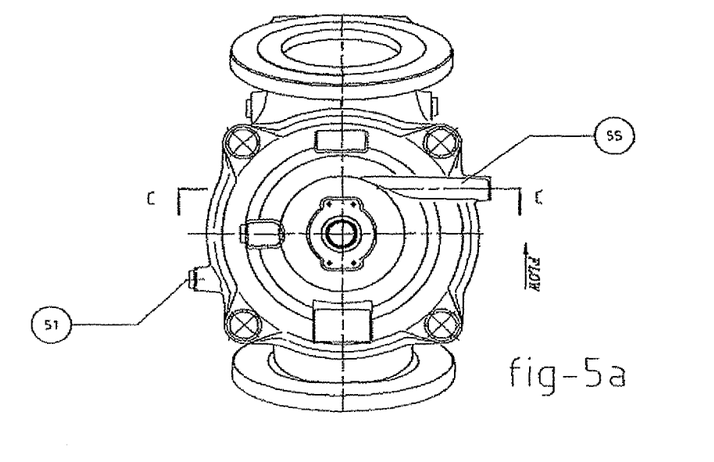
FIG. 5a is a top plan view of the hydraulic control valve in vertical position, in accordance with one embodiment of the present invention.
Figure 5B:
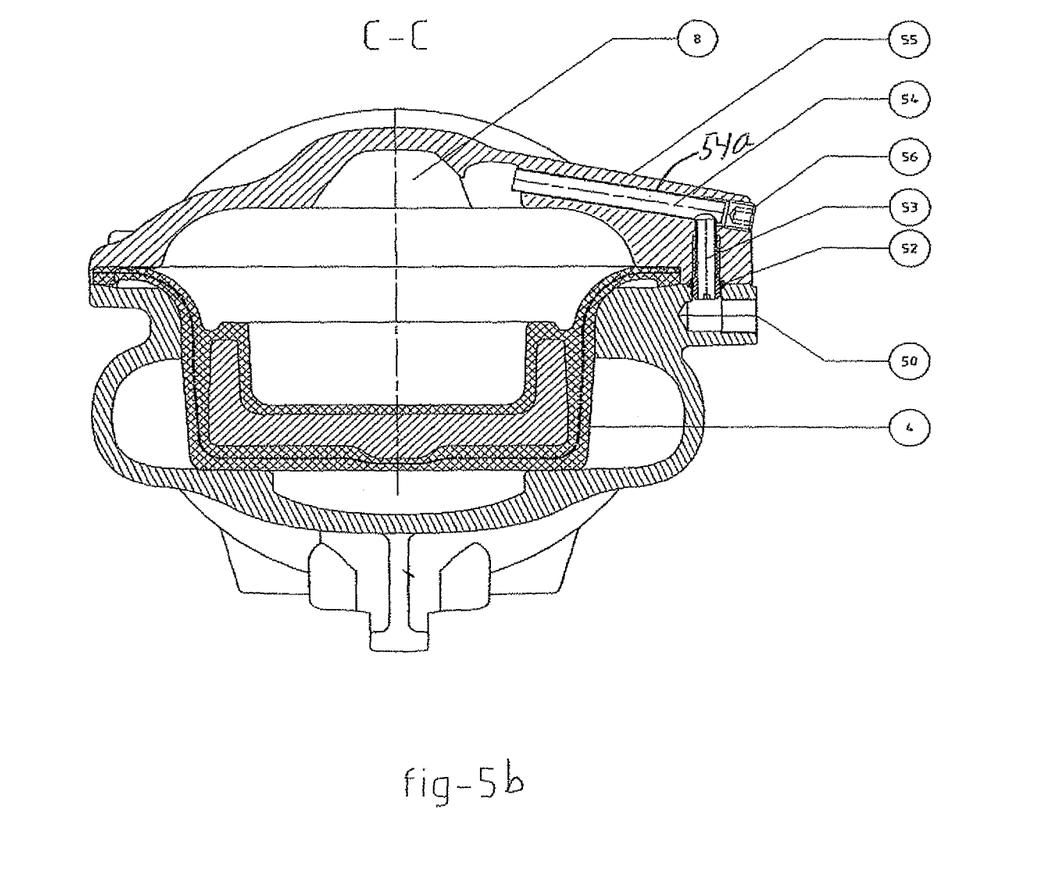
FIG. 5b is a sectional view along line C-C of FIG. 5a showing the internal control passage of the valve cover, in accordance with one embodiment of the present invention.

Accordingly, as seen in FIG. 5b, valve cover 2 may have a hollow internal control tube 54 that may define an internal control passage 54a that may be in communication with a base of the valve 100 and that may be located outside of control chamber 8. Internal control passage 54a may be sufficient to house valve control tubing (not shown) and may be operatively engaged to the valve 100 at a control boss 50 on body 1 with the help of seal 52. Accordingly, valve cover 2 may be removable from body 1 of valve 100 without disconnecting the control equipment (not shown).

Figure 6A:
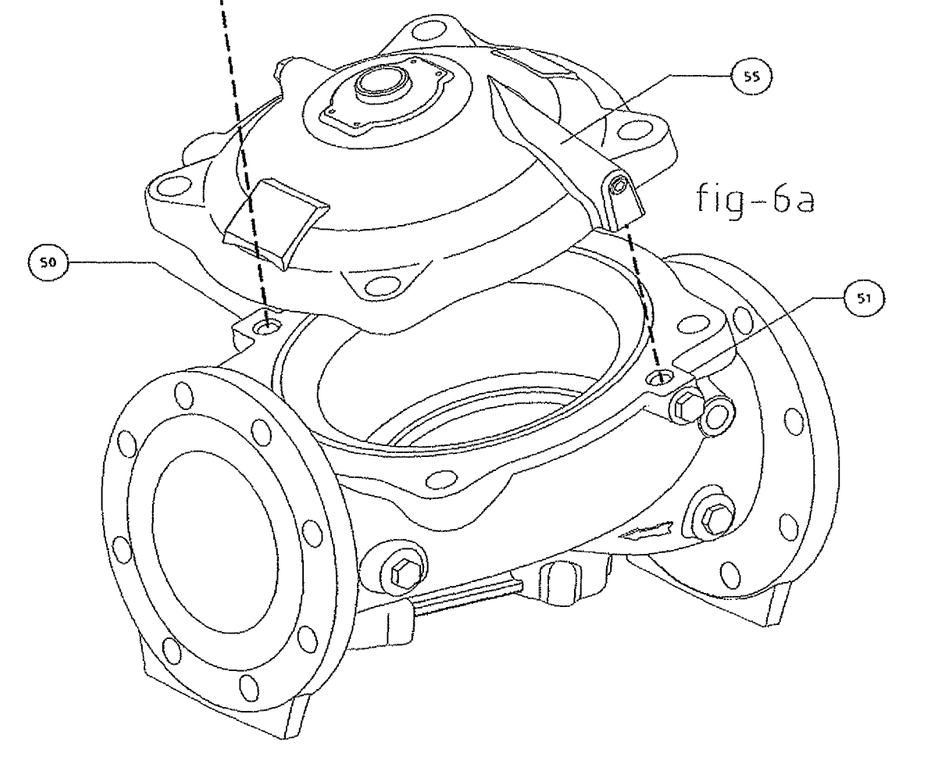
FIG. 6a is a view of the hydraulic control valve with the valve cover exploded away, in accordance with one embodiment of the present invention.

As seen in FIG. 5b and. FIG. 6a, valve cover 2 may have an inner control bulge 55 allowing for inner control tube 54. Cover control pin 53 may assist in positioning of cover 2 on body 1.

Figure 6B:
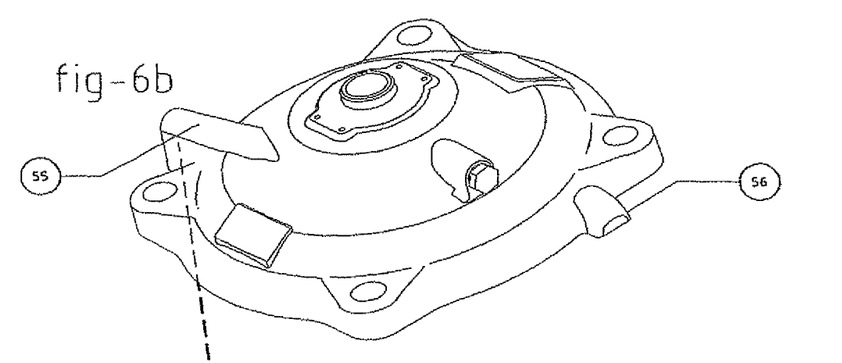
FIG. 6b is a view of the hydraulic control valve with the valve cover exploded away and rotated 180 degrees from that shown in FIG. 6a, in accordance with one embodiment of the present invention.
Figure 6C:
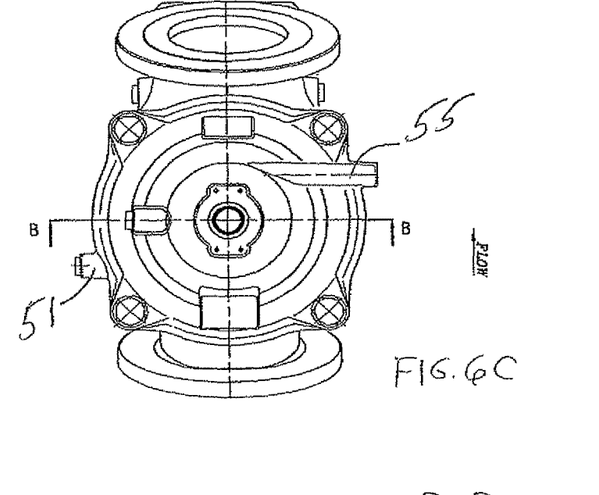
FIG. 6c is a top plan view of the hydraulic control valve in vertical position similar to FIG. 5a, in accordance with one embodiment of the present invention.

As shown in FIG. 6b, valve cover 2 may be operatively engaged to valve body 1 in a second position that may be 180 degrees rotationally from the first position of valve cover 2 shown in FIG. 6a. Accordingly, in the first position shown in FIG. 6a, valve cover 2 with internal control passage 54a may be operatively engaged to control boss 50 and in a second position of the valve cover 2 that is 180 degrees from the first position, valve cover 2 with internal control passage 54a may be operatively engaged to a second body control boss 51 at an opposite side of body 1. In the second position, cover hat 56 on valve cover 2 may cover the body control boss 50. Consequently, in the first position a control mouth (i.e. the end of the internal control tube 54 adjacent control chamber 8) may be at a highest point of the control chamber 8 for horizontal installation of cover 2 and in the second position the control mouth may be at the highest point of the control chamber 8 for vertical installation of the cover. This may be used to remove trapped air during installation of the diaphragm and plug unit 4 in valve 100.

Figure 3:
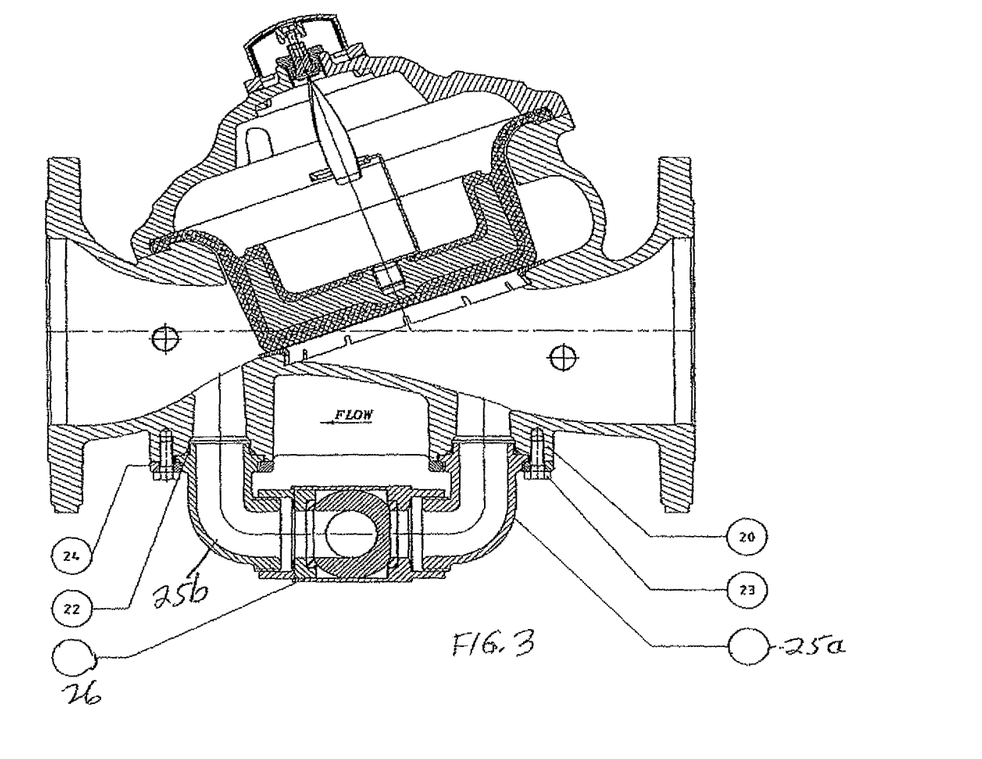
FIG. 3 is a cross-sectional view of the hydraulic control valve showing the two drain hubs connected to the 3-way valve, in accordance with one embodiment of the present invention.
Figure 3A:
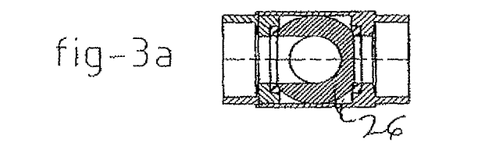
FIG. 3a is a section view showing the 3-way valve positioned to allow downstream drainage, in accordance with one embodiment of the present invention.
Figure 3B:
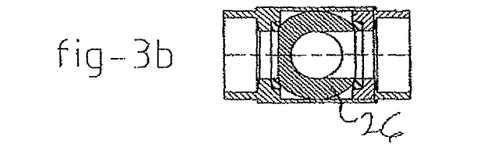
FIG. 3b is a sectional view showing the 3-way valve positioned to allow upstream drainage, in accordance with one embodiment of the present invention.
Figure 3C:
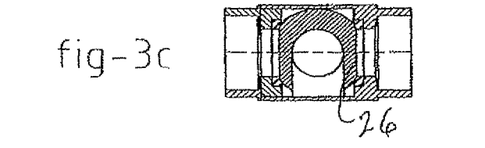
FIG. 3c is a section view showing the 3-way valve positioned to allow neither upstream nor downstream drainage, in accordance with one embodiment of the present invention.

As seen in FIG. 3, valve 100 may also have a first drain hub 25a for draining an upstream side of the valve and a second drain hub 25b for draining a downstream side of the valve. The first and second drain hubs 25a, 25b may have an elbow shape to allow first and second drain hubs 25a, 25b to swivel to fit with drain piping (not shown). Accordingly, as seen in FIG. 3, FIG. 3a, FIG. 3b and FIG. 3c, first drain hub 25a and second drain hub 25b may be capable of being connected to one another at a 3-way valve 26 whereby in a first position (FIG. 3a) the downstream side drains, in a second position (FIG. 3b) the upstream side drains and in a third position (FIG. 3c) neither the upstream nor the downstream side of valve 100 can drain.

While the invention has been described with respect to a limited number of embodiments, it will be appreciated that many variations, modifications and other applications of the invention may be made. Therefore, the claimed invention as recited in the claims that follow is not limited to the embodiments described herein.

What is claimed is:

1. A valve comprising:
a valve body defining a flow path passing through a valve opening, said valve body having a cover;
a plug displaceable along a direction of movement within said valve body from a closed position in which said plug closes said valve opening and an open position in which said plug allows flow through said valve opening;
a rotating indicator associated with an external surface of said cover for indicating a position of said plug; and
a linear-to-rotary linkage associated with said plug and said rotating indicator and configured to convert linear motion of said plug into rotary motion of said rotating indicator, said linear-to-rotary linkage comprising:
a helical track extending along an axis parallel to the direction of movement; and
a bracket supporting a slider in sliding engagement with said helical track,
wherein each of said helical track and said bracket has a dimension along the direction of movement of said plug that is
(a) greater than a range of movement of said plug; and
(b) less than the difference between a maximum gap between said plug and said cover when said plug is in said closed position and said range of movement of said plug.

2. The valve of claim 1, wherein said plug is integrated with a flexible diaphragm, said flexible diaphragm and said cover together defining a control chamber for receiving a variable control pressure so as to control a state of said valve.

3. The valve of claim 1, wherein said rotating indicator is associated with said linear-to-rotary linkage via a sealed connection such that said linear-to-rotary linkage is in a wet volume of the valve and said rotating indicator is in a dry volume.

4. The valve of claim 1, wherein said rotating indicator is deployed to provide a visible indication of a position of said plug.

5. The valve of claim 1, wherein said helical track is formed as an elongated strip twisted about its axis of elongation.

* * * * *